(12) United States Patent
Dinh et al.

(10) Patent No.: US 8,271,692 B1
(45) Date of Patent: Sep. 18, 2012

(54) THROTTLED COMMAND COMPLETION TIME

(75) Inventors: Peter H. Dinh, Laguna Hills, CA (US); Carl E. Barlow, Lake Forest, CA (US); Joseph M. Viglione, Rancho Santa Margarita, CA (US); Sang Huynh, Yorba Linda, CA (US); Chun Sei Tsai, Tustin, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 12/895,851

(22) Filed: Oct. 1, 2010

(51) Int. Cl.
*G06F 3/00* (2006.01)

(52) U.S. Cl. ................. 710/5; 702/56; 702/127

(58) Field of Classification Search .......... 710/5
See application file for complete search history.

(56) References Cited

U.S. PATENT DOCUMENTS

| | | | |
|---|---|---|---|
| 5,680,539 A | 10/1997 | Jones | |
| 5,778,420 A | 7/1998 | Shitara et al. | |
| 6,408,357 B1 * | 6/2002 | Hanmann et al. | 711/113 |
| 6,429,990 B2 * | 8/2002 | Serrano et al. | 360/60 |
| 6,636,909 B1 * | 10/2003 | Kahn et al. | 710/60 |
| 6,678,793 B1 | 1/2004 | Doyle | |
| 6,807,590 B1 | 10/2004 | Carlson et al. | |
| 6,836,785 B1 | 12/2004 | Bakshi et al. | |
| 6,862,151 B2 | 3/2005 | Hoskins et al. | |
| 6,882,489 B1 | 4/2005 | Brunnett et al. | |
| 6,900,958 B1 | 5/2005 | Yi et al. | |
| 7,154,690 B1 | 12/2006 | Brunnett et al. | |
| 7,194,562 B2 * | 3/2007 | Barnes et al. | 710/36 |
| 7,274,639 B1 * | 9/2007 | Codilian et al. | 369/53.17 |
| 7,315,917 B2 | 1/2008 | Bennett et al. | |
| 7,321,477 B2 | 1/2008 | Suzuki et al. | |
| 7,411,757 B2 * | 8/2008 | Chu et al. | 360/69 |
| 7,421,520 B2 | 9/2008 | Wilkins et al. | |
| 7,461,202 B2 | 12/2008 | Forrer, Jr. et al. | |
| 7,525,745 B2 | 4/2009 | Nitta | |
| 7,587,621 B2 | 9/2009 | Krauthgamer et al. | |
| 2005/0152057 A1 | 7/2005 | Schmidt | |
| 2005/0166014 A1 * | 7/2005 | Kobayashi et al. | 711/112 |
| 2006/0112155 A1 | 5/2006 | Earl et al. | |
| 2007/0208849 A1 * | 9/2007 | Ely et al. | 709/224 |
| 2008/0005410 A1 | 1/2008 | Mies et al. | |
| 2008/0209109 A1 * | 8/2008 | Lasser | 711/103 |
| 2008/0250202 A1 | 10/2008 | Conley et al. | |
| 2009/0006720 A1 | 1/2009 | Traister | |

OTHER PUBLICATIONS

U.S. Appl. No. 12/730,078 to Burton, et al. filed Mar. 23, 2010, pp. 1-26.

* cited by examiner

*Primary Examiner* — Elias Mamo (57) ABSTRACT

A storage device comprising a storage media and a controller is disclosed. The controller is configured to receive access commands from a host, to write data to or read data from the storage media based on the access commands, to detect a trigger event, and, when the trigger event is detected, to throttle back the access commands from the host based on an amount of data in a cache.

20 Claims, 8 Drawing Sheets

FIG. 8B

THROTTLED COMMAND COMPLETION TIME

BACKGROUND

Data storage devices are commonly used to store data in computers, data bases, digital video recorders, and other devices. Data storage devices may include disk drives, solid state drives, and hybrid drives including both a disk and solid state memory. A data storage device may write data to and read data from a storage media in response to write/read commands from a host that uses the data storage device for data storage.

When the host sends a write command to the data storage device, the host may require that the data storage device send a command completion status to the host within a certain time period after the write command is sent. If the host does not receive the command completion status from the data storage device within this time period, then the host may timeout and/or reboot.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
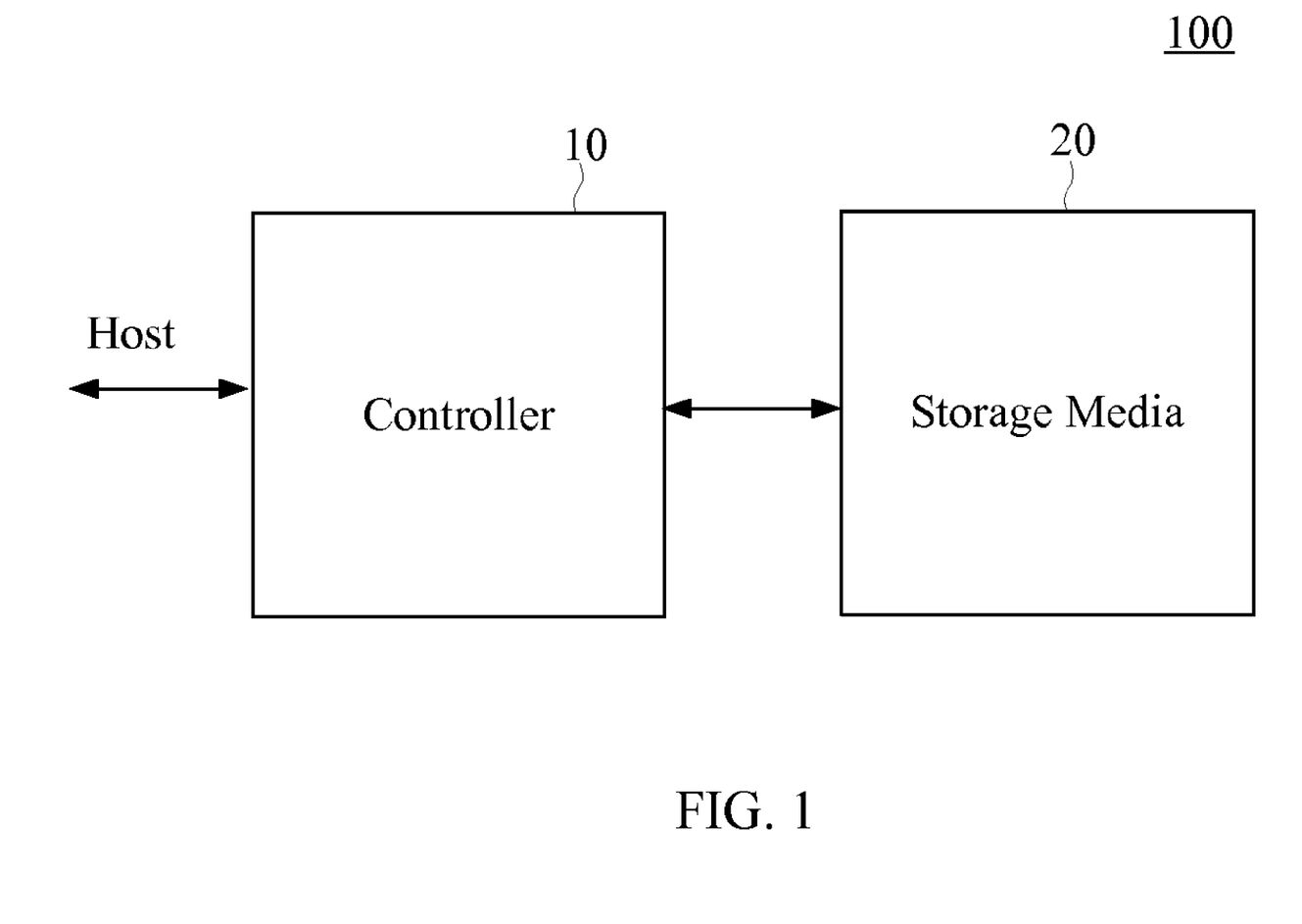
FIG. 1 is a block diagram of a data storage device according to an embodiment of the present invention.

FIG. 1 shows a data storage device 100 according to an embodiment of the present invention. The data storage device 100 comprises a storage media 20 and a controller 10. The storage media 20 may include one or more disks, non-volatile semiconductor memory, or other type of storage media. The controller 10 is configured to write data to and read data from the storage media 20 based on write/read commands from a host, which uses the data storage device 100 to store data. The controller 10 may interface with the host according to a serial advanced technology attachment (SATA) or other interface standard.

Figure 2:
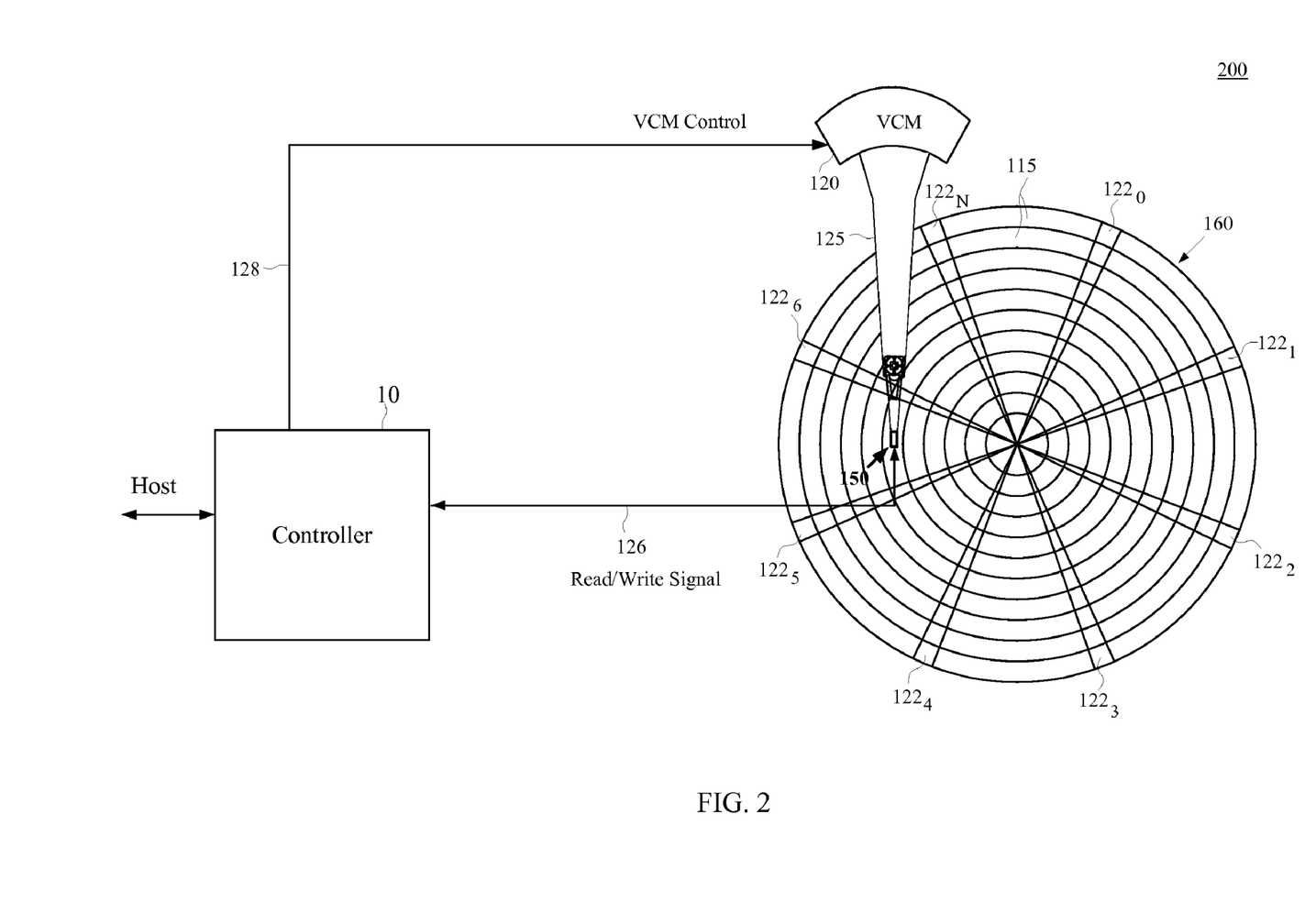
FIG. 2 is a block diagram of a disk drive according to an embodiment of the present invention.

FIG. 2 shows a disk drive 200 according to an embodiment of the present invention. The disk drive 200 comprises a rotating magnetic disk 160, an actuator arm 125, a voice coil motor (VCM) 120, and a head 150 attached to the distal end of an actuator arm 125. The actuator arm 125 is rotated about a pivot by the VCM 120 to position the head 150 radially over the disk 160. A spin motor (not shown) rotates the disk 160.

The disk 160 comprises a number of radially spaced, concentric tracks 115. Each track 115 may be further divided into a number of data sectors (not shown) that are spaced circumferentially along the track 115. The data sectors may be used to store user data and/or other information on the disk 160. The disk 160 may also comprise a plurality of angularly spaced servo wedges $122_0$-$122_N$, each of which may include embedded servo information (e.g., servo bursts) that can be read from the disk 160 by the head 150 to determine the position of the head 150 over the disk 160.

Figure 3:
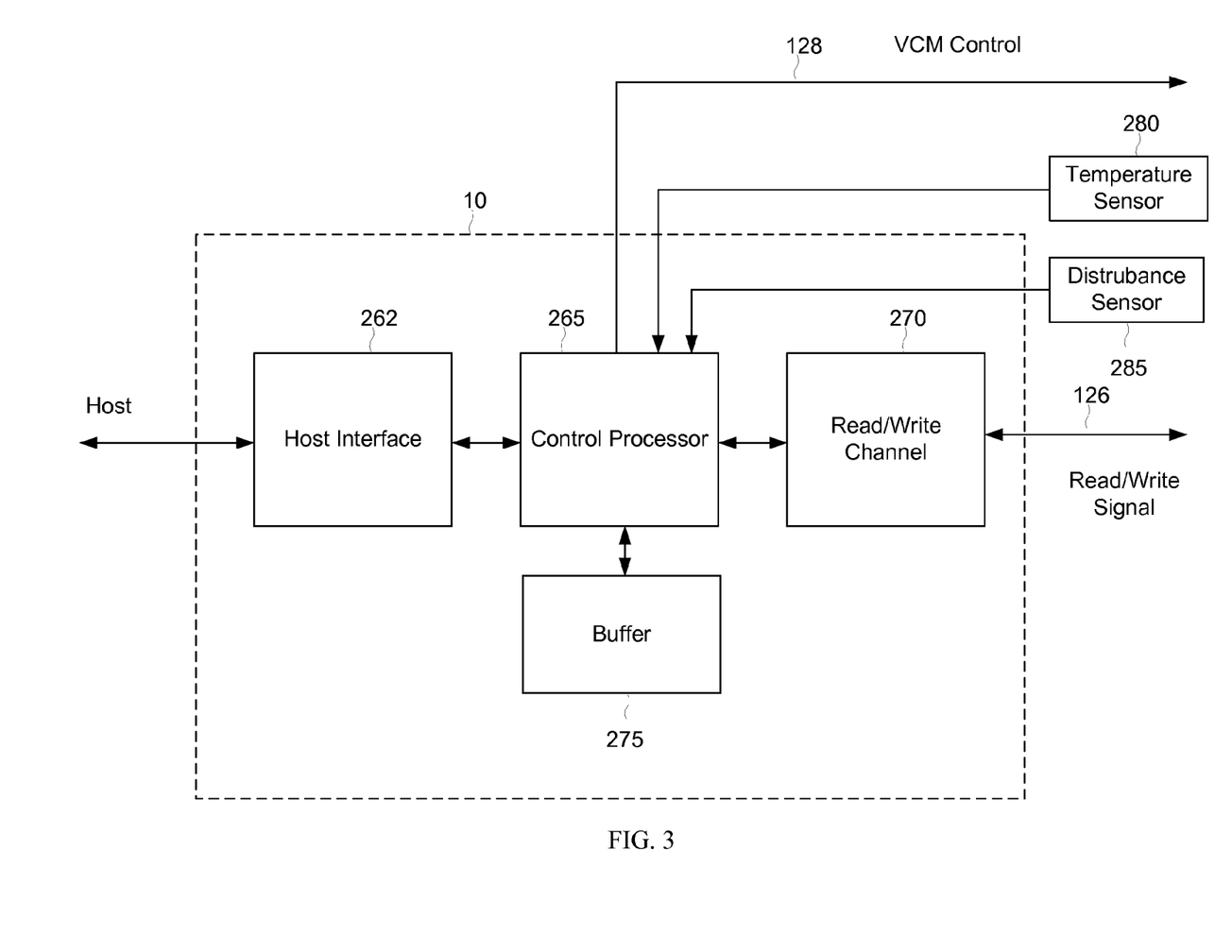
FIG. 3 is a block diagram of a controller according to an embodiment of the present invention.

Referring to FIG. 3, the controller 10 comprises a control processor 265, a read/write channel 270, a host interface 262, and a buffer 275 (e.g., DRAM). The control processor 265 may be implemented using one or more processors for executing instructions (firmware) stored in memory, such as a volatile or non-volatile memory. The instructions may be executed by the one or more processors to perform the various functions of the control processor 265 described herein. The one or more processors may include a microcontroller, a Digital Signal Processor (DSP), an Application Specific Integrated Circuit (ASIC), a Field Programmable Gate Array (FPGA), hard-wired logic, analog circuitry and/or a combination thereof.

The read/write channel 270 is configured to receive data to be written to the disk 160 from the control processor 265 and process the data into a write signal 126, which is outputted to the head 150. The head 150 converts the write signal 126 into a magnetic field that magnetizes the surface of the disk 160 based on the write signal 126, thereby magnetically writing the data to the disk 60. The read/write channel 270 is also configured to receive a read signal 126 from the head 150 based on the magnetization of the disk surface under the head 150. The read/write channel 270 processes the read signal 126 into data, which is outputted to the control processor 265.

The host interface 262 is configured to interface the disk drive 200 with a host (e.g., host processor) that uses the disk drive 200 for data storage. The control processor 265 receives commands (e.g., read/write commands) and data from the host via the host interface 262. The control processor 265 also outputs data (e.g., data requested by a host read command) to the host via the host interface 262. The host interface 262 may interface with the host according to the serial advanced technology attachment (SATA) standard or other standard.

The buffer 275 may include cache for temporarily storing read/write commands and the corresponding data. For example, the cache may be used to temporarily store data between the host and the disk 160.

During normal write/read operations, the control processor 265 may write data to and read data from the disk 160 in response to write/read commands from the host. When the control processor 265 receives a write command via the host interface 262, the control processor 265 may temporarily hold the corresponding data from the host in the cache and transfer the data from the cache to the read/write channel 270 to write the data on the disk 160. The control processor 265 may send a command completion status to the host when the data has been received in cache or when the data has been successfully written to the disk 160 (when the data has been committed to the disk 160). When the control processor 265 receives a read command from the host via the host interface 262, the control processor 265 may read the data requested by the read command from the disk 160 using the read/write channel 270, temporarily hold the read data in the cache and output the read data from the cache to the host via the host interface 262.

To write data to the disk 160, the control processor 265 may first position the head 150 at a desired track on the disk 160. The control processor 265 may do this by sending a command 128 to the VCM 20 to position the head 150 at the desired track. After the head 150 is positioned at the desired track, the control processor 265 may perform track following to keep the head 150 on the desired track. The control processor 265 may do this by reading servo information (e.g., servo bursts) from the servo wedges on the track via the read/write channel 270 and generating a position error signal (PES) based on the read servo information indicating the offset of the head 150 from the center of the desired track. The control processor 265 may then send a command 128 to adjust the position of the head 150 in a direction that reduces the PES, thereby keeping the head 150 on track. When the head 150 is properly positioned, the control processor 265 may transfer the data from the cache to the read/write channel 270 to write the data to the disk 160 using the head 150.

When the host sends a write command to the disk drive 200, the host may require that the disk drive 200 send a command completion status to the host within a certain time period after the write command is sent. The time period may be referred to as a command completion time limit. If the host does not receive a command completion status from the disk drive within the command completion time limit, then the host may timeout and/or reboot. In one embodiment, the host may globally set the command completion time limit for all write commands sent to the disk drive 200. In another embodiment, the host may set the command completion time limit on a per command basis, in which each write command specifies a command completion time limit.

It is important for the head 150 to stay on track during a write operation. If the head 150 is off track (e.g., due to shock and/or vibration), then the head 150 may overwrite data in an adjacent track, resulting in data loss. To avoid this, the control processor 265 may continuously compare the position error signal (PES) to a write unsafe (WUS) limit. If the PES exceeds the WUS limit during a write operation, then the control processor 265 may abort the write operation and retry the write operation at a later time when the PES falls back below the WUS limit. The disk drive 200 may also include a disturbance sensor 285 configured to detect a disturbance that impacts write performance such as shock and/or vibration. When the disturbance sensor 285 detects a disturbance during a write operation, the control processor 265 may abort the write operation and retry the write operation at a later time.

Thus, the disk drive 200 may require stringent on-track performance for a prolong period of time while executing writes to the disk 160. Due to shock and/or vibration, the write operation for a write command may be broken into multiple retries, extending the time to complete the command. As a result, the disk drive 200 may be unable to complete the command within the command completion time limit set by the host, triggering a time out, reboot and/or other undesirable side effect.

One approach to avoid exceeding the command completion time limit is for the control processor 265 to send a command completion status for a write command to the host as soon as the corresponding data is received in the cache. As a result, the control processor 265 does not need to write the data to the disk 160 before sending the command completion status to the host. When the write performance to the disk 160 is reduced due to shock and/or vibration, this approach may give the control processor 265 more time complete the write to the disk 160 without triggering a command time out.

However, the cache space may be limited. As a result, when the write performance to the disk 160 is reduced for a prolong time period, the cache may become full. This is because the cache may continue to receive write commands from the host while the control processor 265 is unable to transfer data from the cache to the disk 160 (flush the cache) fast enough to make room for the incoming write commands. If the cache becomes full, then the disk drive may be unable to receive data for an incoming write command in the cache, and therefore be unable to send a command completion status to the host within the command completion time limit.

In one embodiment, the control processor 265 prevents the cache from becoming full by throttling back write commands from the host based on the amount of data in the cache. Throttling back the commands from the host reduces the flow of commands to the disk drive 200, giving the disk drive more time to flush the cache to make more cache space available. In one embodiment, the control processor 265 may throttle back commands from the host so that the amount data going into the cache from the commands is in equilibrium with the amount of data in the cache being flushed to the disk. This ensures that cache space is available for commands from the host.

In one embodiment, the control processor 265 may throttle back commands from the host using a throttled command completion time. The throttled command completion time may define a time duration during which the disk drive 200 does not receive a new command from the host. Thus, the control processor 265 may use the throttled command completion time to adjust the period between commands from the host, and thus the flow of commands from the host. An upper limit of the throttled command completion time may be the command completion time limit set by the host to avoid triggering a time out. In one embodiment, the control processor 265 may adjust the throttled command completion time based on the amount of data in the cache, as discussed below.

In one embodiment, the control processor 265 may stop the host from sending a new command during the throttled command completion time by asserting a busy signal to the host via the host interface 262 for the duration of the throttled command completion time. In this embodiment, the host does not send a command to the disk drive when the busy signal is asserted.

In another embodiment, the control processor 265 may stop the host from sending a new command during the throttled command completion time by withholding a command completion status to the host for the duration of the throttled command completion time. In one embodiment, the cache may include a queue for receiving commands from the host, in which the queue has an associated queue depth. In this embodiment, the control processor 265 may release a write command from the queue by sending a command completion status to the host for the command. When the number of commands in the queue reaches the queue depth, the host may not send a new command to the disk drive 200 until a command is released from the queue by a command completion status. Thus, when the queue depth is reached, the control processor 265 may stop the host from sending a new command by withholding a command completion status for the duration of the throttled command completion time.

The throttled command completion time may be dynamically adjusted based on the amount of data in the cache. For example, the throttled command completion time may be increased when the amount of data in the cache increases. Thus, as the cache fills with data, the throttled command completion time may be increased to throttle back the commands from the host by a greater amount to give the control processor 265 more time to flush the cache.

In one embodiment, the control processor 265 may dynamically adjust the throttled command completion time according to the following equation:

$$TCCT = (\% \, CCTL) \cdot (\% \, Cache\_Full) \quad (1)$$

where TCCT is the throttled command completion time, % CCTL is a percentage of the command completion time limit, and % Cache_Full is the percentage of the cache that is full. As, discussed above, the command completion time limit may be the maximum delay allowed by the host for receiving a command completion status. In this example, % CCTL sets the upper limit of the throttled command completion time as a percentage of the command completion time limit.

Figure 4:
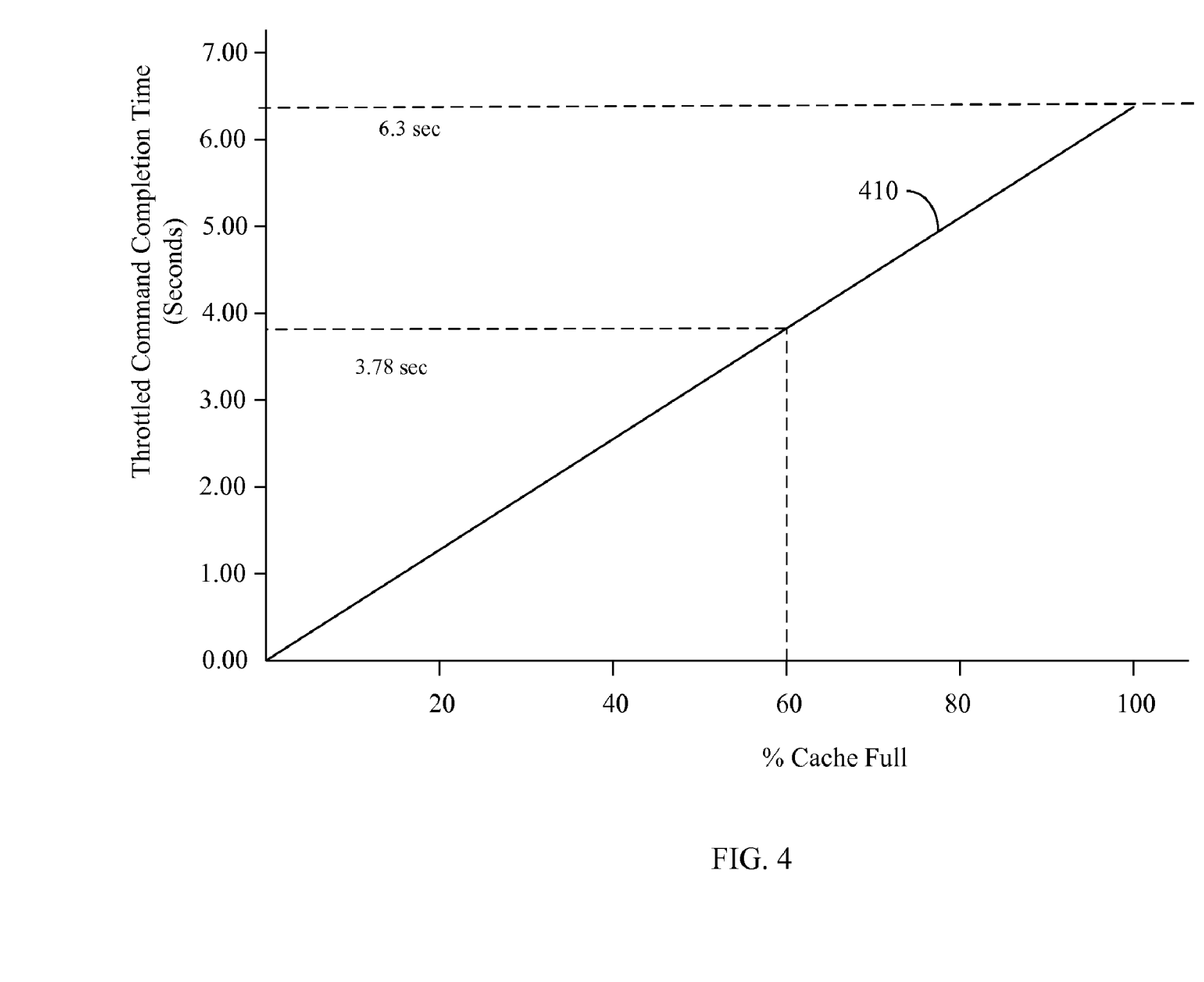
FIG. 4 is a plot showing an example of a function for determining throttled command completion time according to an embodiment of the present invention.

FIG. 4 shows an example of a plot of the throttled command completion time as a function of the amount of data in the cache according to Equation (1). In this example, the command completion time limit is 7 seconds and the percentage of the command completion time limit used in Equation (1) is about 90%. In this example % CCTL is approximately 6.3 seconds. Thus, when the cache is full in this example, the throttled command completion time reaches an upper limit of approximately 6.3 seconds (90% of the command completion time limit). In this example, the throttled command completion time is about 3.78 seconds when the cache is 60% full. As shown in FIG. 4, the throttled command completion time in this example is a linear function of the amount of data in the cache, in which the slope of the throttled command completion time curve 410 is given by % CCTL.

Figure 5:
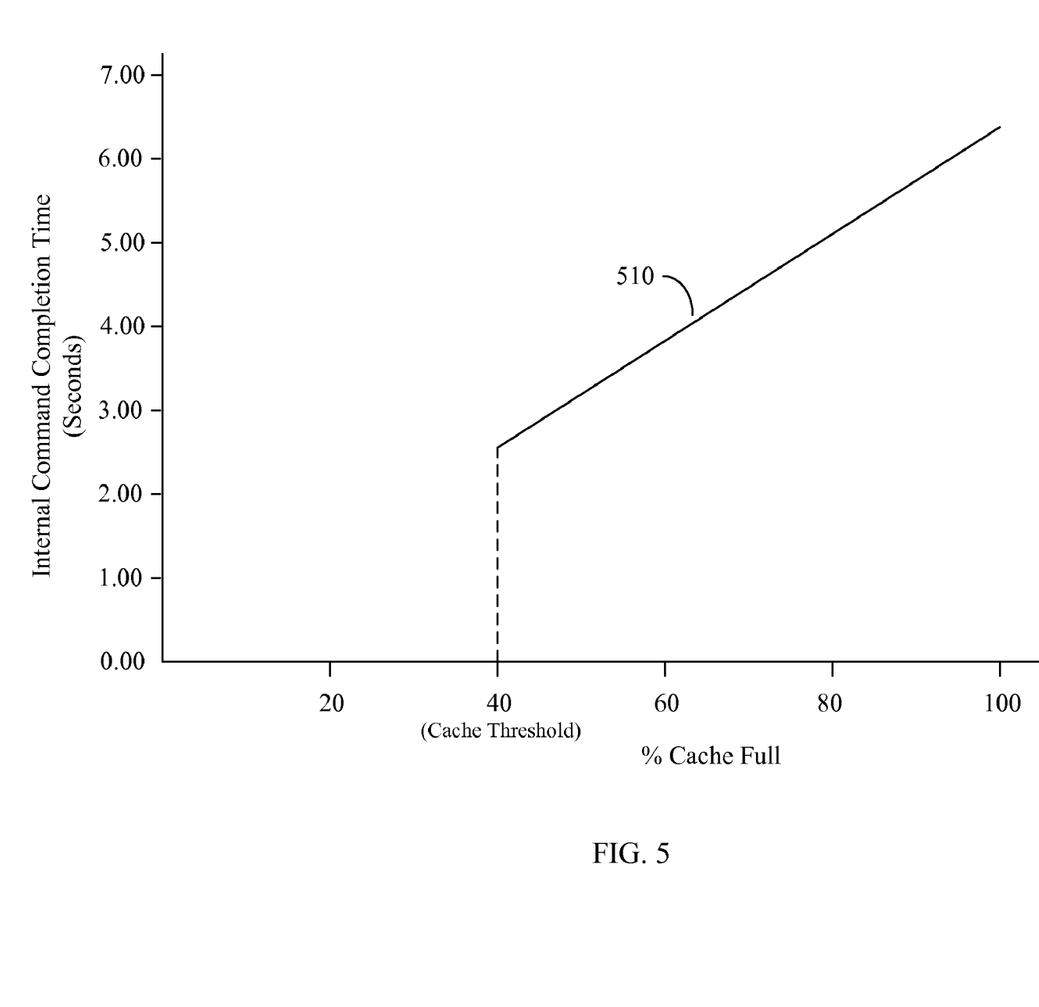
FIG. 5 is a plot showing an example of a function for determining throttled command completion time with a cache threshold according to an embodiment of the present invention.

In one embodiment, the control processor 265 may not throttle back commands from the host until the amount of data in the cache reaches a certain threshold. FIG. 5 shows an example of a throttled command completion time curve 510 according to the example in FIG. 4, in which the control processor 265 does not throttle back command until the cache is 40% full.

Figure 6:
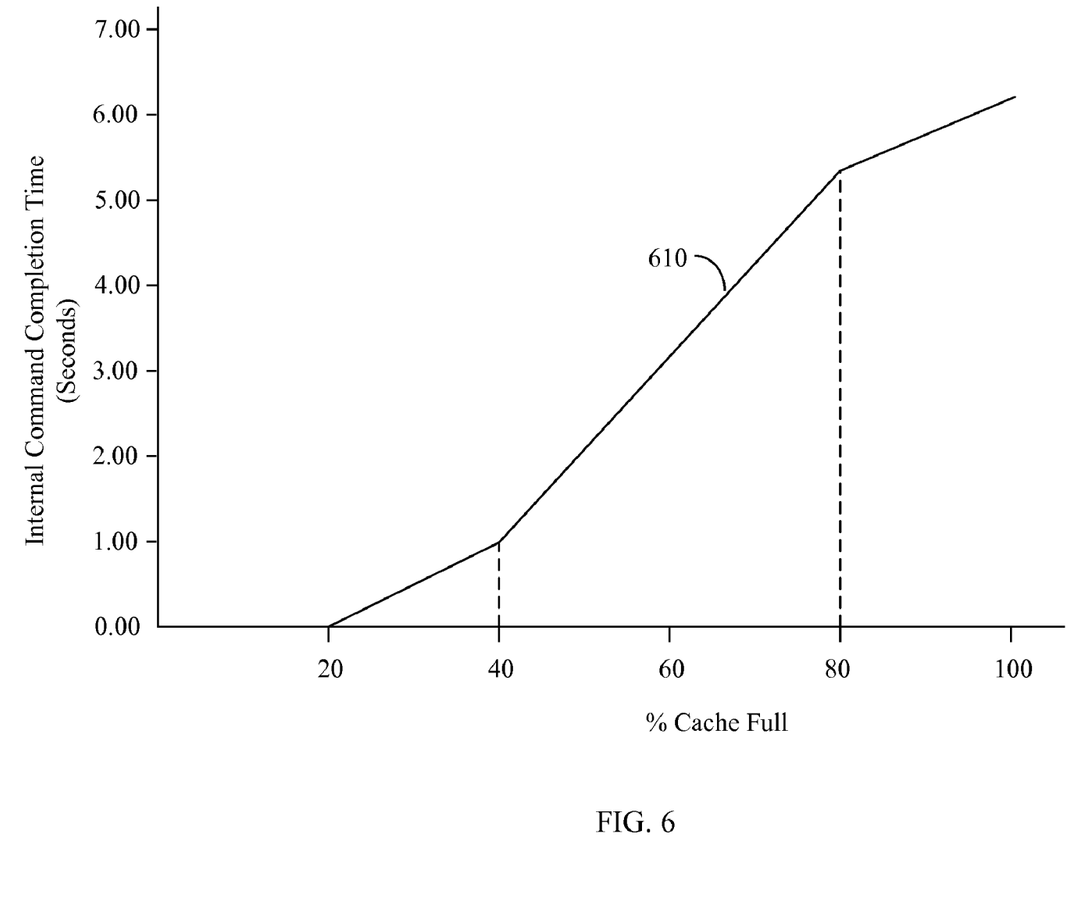
FIG. 6 is a plot showing another example of a function for determining throttled command completion time according to an embodiment of the present invention.

Other functions may be also used to determine the throttled command completion time as a function of the amount data in the cache, including a parabolic function, a stepwise function, a second order function or other type of function. For example, FIG. 6 shows an example in which the slope of the throttled command completion time curve 610 is different for different ranges of the amount of data in the cache. In this example, the throttled command completion time increases at a greater rate when the cache is between 40% full and 80% full and levels off when the cache is more than 80% full.

In one embodiment, the control processor 265 may throttle back commands from the host when a trigger event occurs. In this embodiment, when the trigger event is not present, the control processor 265 may send a command completion status to the host when the corresponding command is completed (e.g., received in cache or written to the disk).

In one embodiment, the trigger event may be a condition that reduces performance of data writes to the disk 160. A reduction in the performance of data writes to the disk 160 reduces ability of the disk drive to flush the cache, and therefore increases the likelihood that the cache will become full. To prevent this from occurring, the control processor 265 may start throttling back commands from the host when this trigger event occurs.

The control processor 265 may detect a reduction in the performance of writes to the disk 160 using various approaches. For example, the control processor 265 may detect a reduction in the performance of writes to the disk 160 when a number of retries to write data on the disk 160 exceeds a certain amount and/or the position error signal (PES) exceed a write unsafe (WUS) limit. As discussed above, the disk drive may retry writing data on the disk 160 when a prior attempt to write the data is aborted due to shock and/or vibrations.

In another example, the control processor 265 may detect a reduction in the performance of writes to the disk 160 when the disturbance sensor 285 detects a disturbance such as shock and/or vibration. In this example, the disturbance 285 may include one or more accelerometers to detect sudden motion due to shock.

In yet another example, the control processor 265 may detect a reduction in the performance of writes to the disk 160 when a temperature reading from a temperature sensor 280 at the VCM 120 exceeds a threshold. In this example, when the temperature of the VCM 120 becomes too high, the data writes to the disk 160 may be reduced to avoid overheating the VCM 120.

In one embodiment, the trigger event may be a condition that reduces the ability of the control processor 265 to process commands from the host. For example, the ability of the control processor 265 to process command from the host may be reduced when the control processor 265 is busy performing background operations. An example of a background operation is a refresh operation, in which the control processor 265 refreshes data on the disk 160 by reading the data from the disk 160, temporarily storing the read data in the cache, and rewriting the data back to the disk 160. The control processor 265 may periodically perform a refresh operation to refresh data on the disk 160 that has deteriorated over time, e.g., due to adjacent track interference, thermal degradation, and/or other cause. In this example, the control processor 265 may start throttling commands from the host when the control processor 265 is performing a certain number of background operations that affect the ability of the control processor 265 to process commands from the host.

In one embodiment, the trigger event may be a command instructing the control processor 265 to throttle back commands from the host. The command may be stored in firmware and may be programmed at the time of manufacture. This may be done to intentionally reduce the write performance of the disk drive 200 from the host perspective by a certain amount. For example, the write performance may be intentionally reduced to reduce the level of wear in the disk drive and therefore extend the life of the disk drive. In another example, the write performance may be intentionally reduced when the disk drive 200 is intended to be sold as a lower performing disk drive 200. In this embodiment, the disk drive 200 may later be reprogrammed to remove the command and remove the restriction on the write performance.

Figure 7:
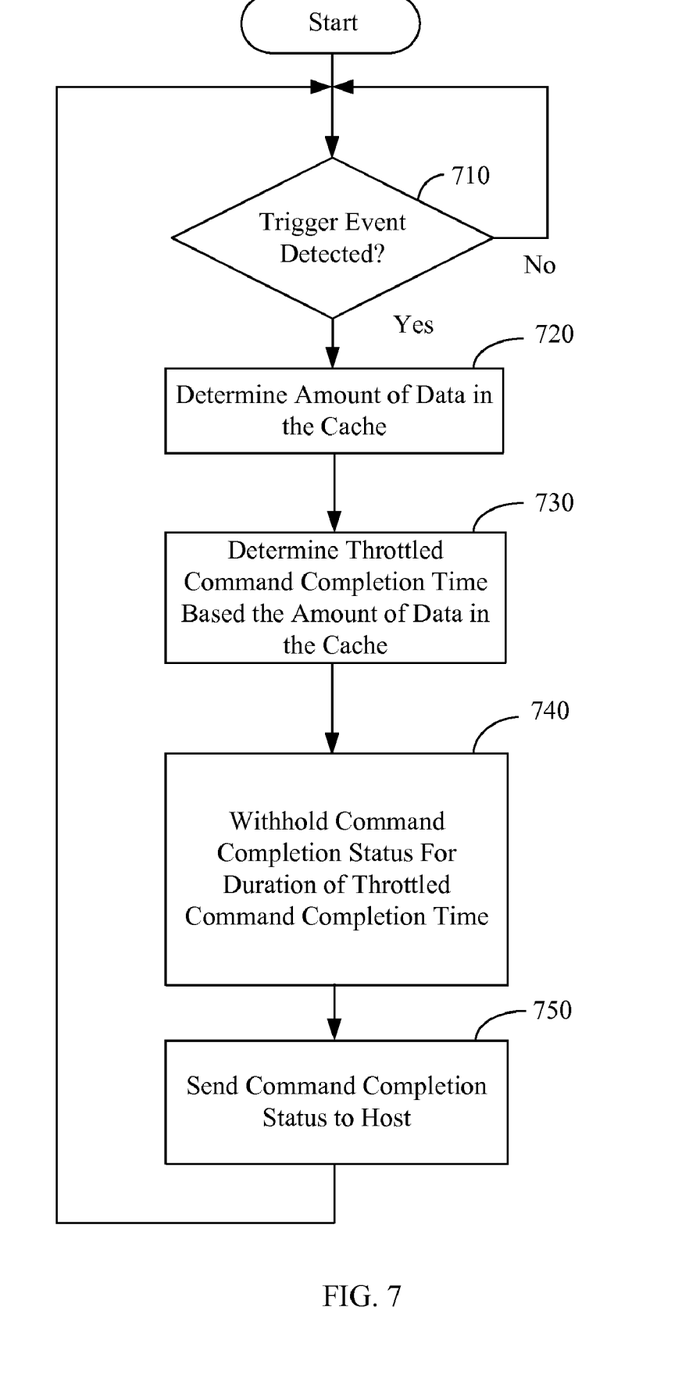
FIG. 7 is a flow diagram of a method of regulating the flow of commands from a host according to an embodiment of the present invention.

FIG. 7 is a flow diagram of a method of regulating a flow of access commands from a host to a storage device according to an embodiment of the present invention.

In step 710, a trigger event is detected. As discussed above for the example of a disk drive, the trigger event may be a condition (e.g., shock and/or vibration) reducing the performance of data writes to the disk 160, a condition (e.g., background operation) reducing the ability of the control processor 265 to process commands from the host or a command limiting the write performance of the disk. If the trigger event is not detected in step 710, then the method is restarted. If the trigger event is detected in step 710, then the method proceeds to step 720.

In step 720, the amount of data in the cache is determined. In step 730, a throttled command completion time is determined based on the amount of data in the cache. In step 740, a command completion status is withheld from the host for the duration of the throttled command completion time. For example, when the control processor 265 receives a command from the host, the control processor 265 may withhold the command completion status for the command from the host for the duration of the throttled command completion time. In step 750, the command completion status is sent to the host after the throttled command completion time expires. As discussed above, the upper limit of the throttled command completion time may be the command completion time limit set by the host so that the throttled command completion time does not withhold the command completion status long enough to trigger a command time out.

Figure 8A:
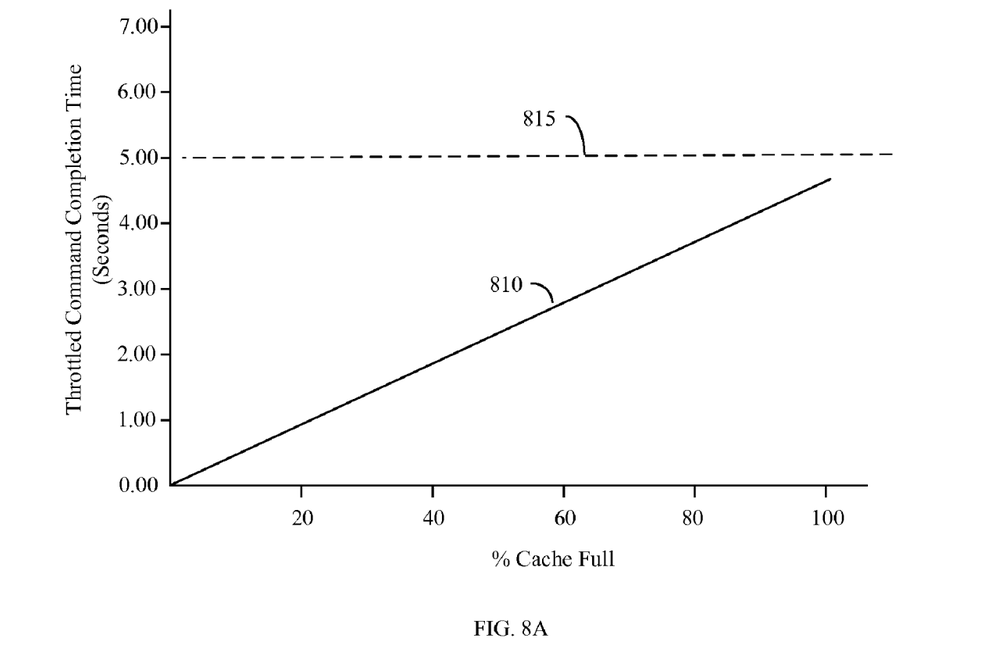
FIGS. 8A and 8B are plots showing two different functions for determining throttled command completion time according to an embodiment of the present invention.
Figure 8B:
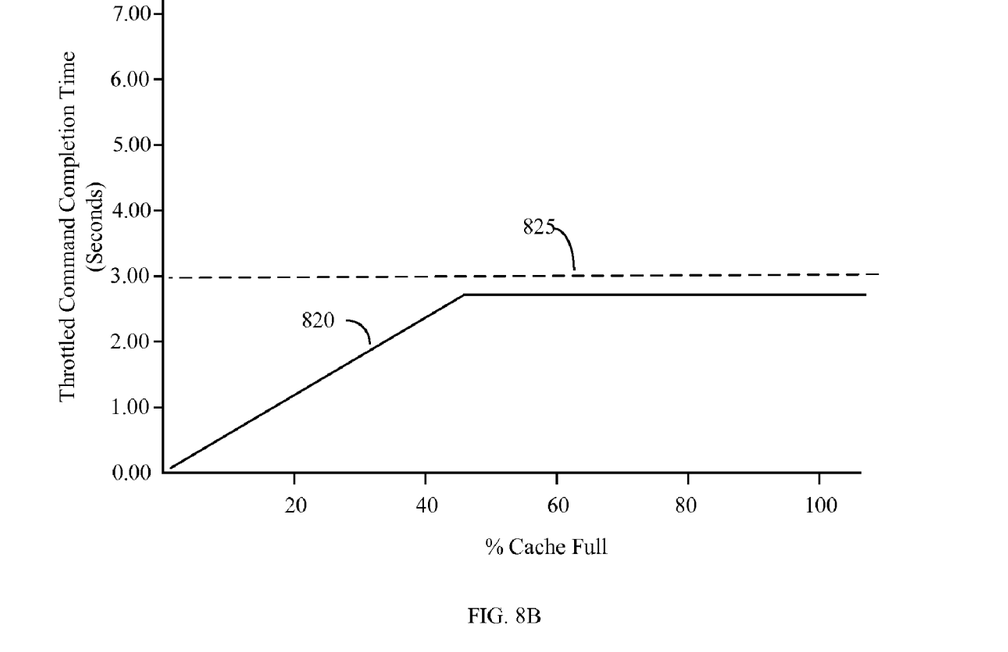

As discussed above, the host may set the command completion time limit on a per command basis, in which each command from the host may specify a command completion time limit. In this embodiment, the control processor 265 may dynamically change the function used to determine the throttled command completion time for each command based on the command completion time limit for that command. For example, the control processor 265 may select a function from a plurality of functions to determine the throttled command completion time for a command based on the command completion time limit for the command. FIGS. 8A and 8B show an example of two different threshold command completion time functions 810 and 820 corresponding to different command completion time limits. FIGS. 8A and 8B also show upper limits 815 and 825 for the respective threshold command completion time functions 810 and 820. In this example, throttled command completion time function 820 corresponds to a shorter command completion time limit than throttled command completion time function 810, and therefore has a lower upper limit 825. As shown in this example, the throttled command completion time function 820 for the shorter command completion time limit reaches the corresponding upper limit 825 faster. This is because the ability of the control processor 265 to throttle back commands from the host is more restricted when the command completion time limit is shorter.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A storage device, comprising:
   a storage media; and
   a controller configured to:
   receive access commands from a host, to write data to or read data from the storage media based on the access commands;
   determine a throttled command completion time based on an amount of data in a cache, wherein the throttled command completion time defines a time duration which the storage device does not receive a new access command from the host;
   detect a trigger event; and,
   when the trigger event is detected, throttle back the access commands from the host by withholding a command completion status from the host for the duration of the throttled command completion time,
   wherein the controller is configured to dynamically adjust the throttled command completion time based on changes in a command completion time limit from the host.

2. The storage device of claim 1, wherein the trigger event comprises a condition reducing performance of data writes to the storage media.

3. The storage device of claim 1, wherein the trigger event comprises a command instructing the controller to throttle back commands from the host.

4. The storage device of claim 1, wherein the trigger event comprises a background operation performed by the controller.

5. The storage device of claim 1, wherein the throttled command completion time is based on a percent of the cache that is full.

6. The storage device of claim 1, wherein the controller is configured to determine the throttled command completion time when the amount of data in the cache exceeds a threshold.

7. The storage device of claim 1, wherein the throttled command completion time is a linear function of the amount of data in the cache.

8. The storage device of claim 1, wherein the throttled command completion time is based on a maximum delay time allowed by the host for the storage device to complete an access command before the host asserts a time out.

9. The storage device of claim of 2, wherein the controller is configured to detect the condition based on a number of retries of data writes to the storage media.

10. The storage device of claim 2, further comprising a temperature sensor, wherein the controller is configured to detect the condition based on a temperature reading from the temperature sensor.

11. The storage device of claim 2, further comprising a disturbance sensor configured to detect shock or vibration in the storage device, wherein the controller is configured to detect the condition based on a reading from the disturbance sensor.

12. The storage device of claim 1, wherein the storage media comprises a disk.

13. A method of regulating a flow of access commands from a host to a storage device, comprising:
- determining a throttled command completion time based on an amount of data in a cache, wherein the throttled command completion time defines a time duration which the storage device does not receive a new access command from the host;
- detecting a trigger event; and
- when the trigger event is detected, throttling back the access commands from the host by withholding a command completion status from the host for the duration of the throttled command completion time; and
- dynamically adjusting the throttled command completion time based on changes in a command completion time limit from the host.

14. The method of claim 13, wherein the trigger event comprises a condition reducing performance of data writes to the storage media.

15. The method of claim 13, wherein the trigger event comprises a command specifying a reduction in write performance of the storage device.

16. The method of claim 13, wherein the throttled command completion time is based on a percent of the cache that is full.

17. The method of claim 13, wherein the throttled command completion time is based on a maximum delay time allowed by the host for the storage device to complete an access command before the host asserts a time out.

18. The method of claim 14, wherein the detecting the condition is based on a number of retries of data writes to the storage media.

19. The method of claim 14, wherein the detecting the condition is based on a temperature reading from a temperature sensor.

20. The method of claim 14, wherein the detecting the condition is based on a reading from a disturbance sensor configured to detect shock or vibration in the storage device.

* * * * *